Figure 1:
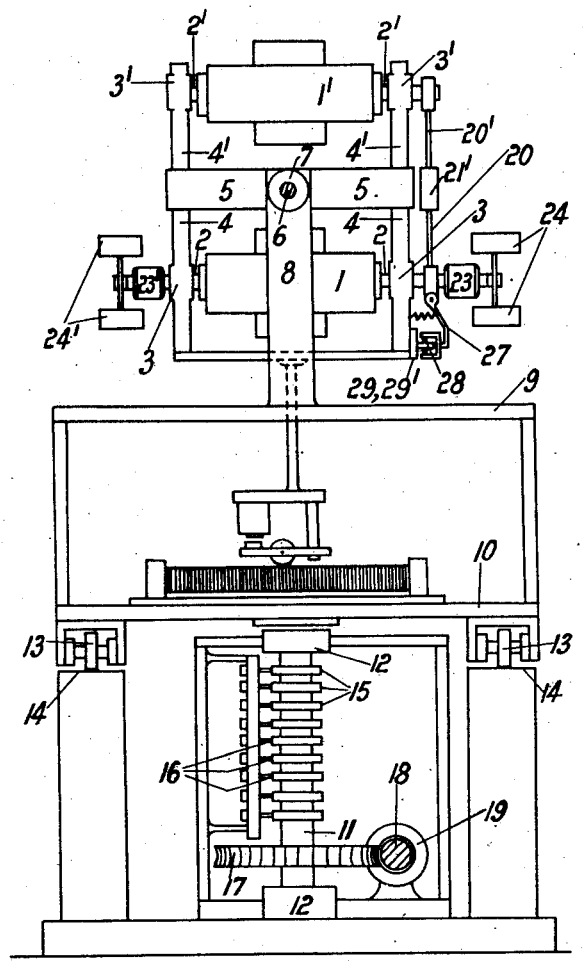

Oct. 17, 1933.    J. G. GRAY    1,931,191
GYROSCOPIC APPARATUS
Filed June 18, 1929    2 Sheets-Sheet 1

Inventor:
James Gordon Gray,
by Calver Kalor,
Attorneys.

Oct. 17, 1933.                J. G. GRAY                1,931,191
                         GYROSCOPIC APPARATUS
                       Filed June 18, 1929        2 Sheets-Sheet 2

Inventor:
James Gordon Gray,
by Calvert Kalen,
Attorneys.

Patented Oct. 17, 1933

1,931,191

UNITED STATES PATENT OFFICE 1,931,191

GYROSCOPIC APPARATUS

James Gordon Gray, Glasgow, Scotland

Application June 18, 1929, Serial No. 371,805, and in Great Britain June 19, 1928

1 Claim. (Cl. 74—78)

In the specification of United States Letters Patent No. 1,736,039, dated 19th November 1929 there is described a gyroscopic stabilizer adapted for use on a rolling and pitching vehicle, such as a ship, aeroplane or airship. In the general form of the invention described in the said specification a frame or the equivalent is mounted on horizontal pivots which engage bearings arranged on uprights carried by the vehicle, the frame being provided with gravity control with respect to the pivots such that when the frame and its carried system is in the resting position the centre of gravity lies below the line of the said pivots. In one form of the apparatus, shown in Fig. 11 of the drawings accompanying the said specification 1,736,039, the frame carries a system of two gyroscopes each attached to the frame by two pivots, the lines of the pairs of pivots being parallel to one another. The gyroscopes are similar to one another, and spin in opposite directions. One of the gyroscopes is centralized by springs and is able to precess while the other gyroscope is rigidly attached to the frame. When the gyroscopic system is oscillating, damping couples are applied by a system of vanes which are rotated by a reversible motor operated by a contact arm and commutator which depends for its action on the relative motion of the first gyroscope and the frame, the couples being applied in a plane perpendicular to the line of the pivots which attach the frame to the uprights. Provided by the second gyroscope is a component of spin of angular momentum which lies across the frame and whose direction and amount is such that when the vehicle turns the so-called centrifugal couple applied to the frame is neutralized by the gyroscope couple which results from the turning in azimuth of the component of spin. If the uprights lie fore and aft with respect to the moving vehicle, the amount of the component of spin is $MVh$, where $M$ is the mass carried by the fore and aft pivots, $h$ is the distance of the centre of gravity of the frame below the line of these pivots, and $V$ is the speed of the vehicle.

The present invention is a development of that described in the specification of the said patent and contemplates notably an arrangement of vane systems, operated by motors, rotatables respectively about an axis of the pivots of one of the gyroscopes and an axis perpendicular thereto, and a system of constants controlling the operation of the motors as set forth in the appended claim.

Figure 2:
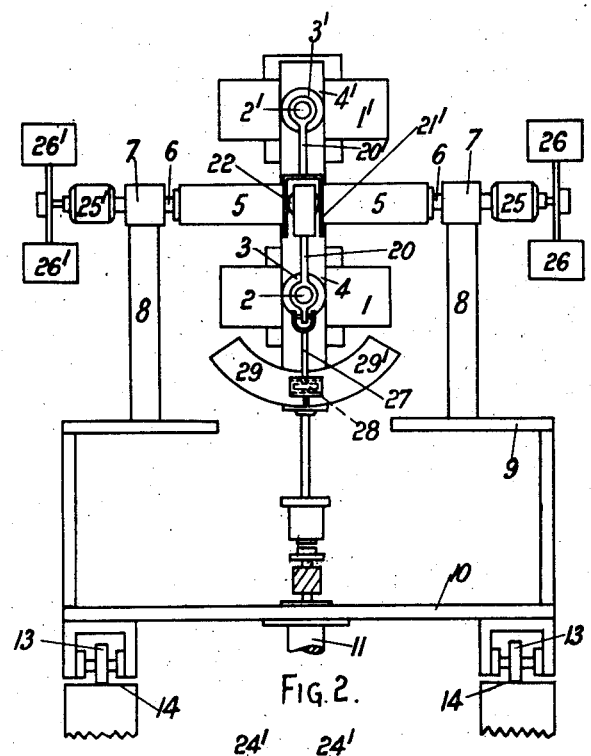

The invention is illustrated more or less diagrammatically in the accompanying drawings in which Figs. 1 and 2 are views in planes at right angles to one another of one embodiment.

Figure 3:
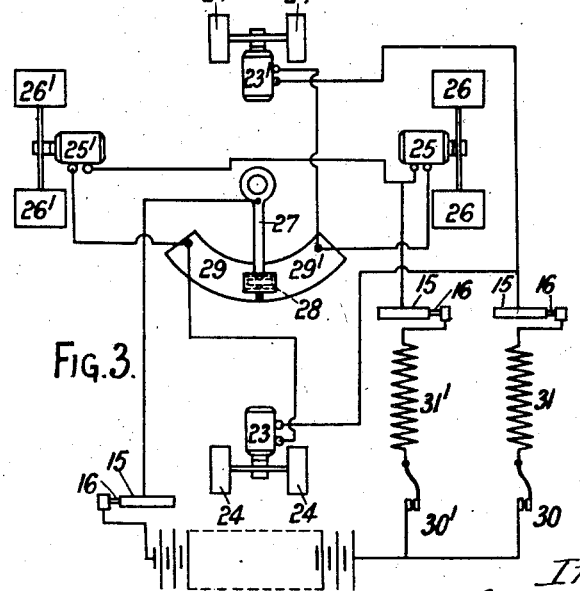

Fig. 3 is a wiring diagram applicable to the embodiment of the invention shown in Figs. 1 and 2.

The casing of two similar gyroscopes 1 and 1' are attached as shown to uprights 4, 4' by means of pivots 2, 2' which engage bearings 3, 3' carried by the uprights. The uprights 4, 4' form part of a pendulous frame 5 attached by means of pivots 6 and bearings 7 to uprights 8 which form part of a main frame 9. The frame 9, including a horizontal platform 10, is carried on a vertical spindle 11 mounted in bearings 12 and on castors 13 of which there are three or more. The castors 13 engage a horizontal circular track 14. Mounted on the spindle 11 are slip rings 15 cooperating with brushes 16 which serve to convey electric current to the gyroscopes and motors which form part of the pivotal system.

Secured to the lower end of the spindle 11 is a worm wheel 17 meshing with a worm 18 mounted on the spindle of an electric motor 19. When the motor 19 is running, the frame 9 of the pivotal system rotates in azimuth.

The axis of spin of each gyroscope is normally vertical and intersects the axis of its supporting pivots 2, 2, or 2', 2'. One of the pivots 2' is extended and carries an arm 20' having a bifurcated end 21' engaging a roller 22 journalled in an arm 20 carried by an extension of the corresponding pivot 2. The frames of the gyroscopes 1, 1' are thus linked together in such manner that they are constrained to turn about the axes of their supporting pivots, which, as will be seen, are parallel to one another in opposite directions. When the arms 20 and 20' are in line, the axes of spin of the gyroscopes are parallel to one another.

On extensions of the pivots 2 are carried two small electric motors 23, 23' the spindles of the motors being in line with, or parallel to the line of the pivots. Mounted on the spindle of each motor is a system of vanes 24, 24'. When either of the motors 23, 23' is set in motion the attached vanes are carried through the air at high speed and experience considerable resistance. As a consequence, a couple is applied to the casing of the motor and consequently to the gyroscopes which, as stated, are linked together in such manner that they turn or precess about the axes of their supporting pivots in opposite directions, in planes perpendicular to the axes of the pivots 2, 2'. The motors 23, 23' are adapted to run in opposite directions with the result that when one motor is running the couple is in one direction, and when this motor stops and the other is switched into action the direction of the couple is reversed.

Carried by the frame 5 are two motors 25, 25' fitted as shown with systems of vanes 26, 26' of the type already described. When one or other of these motors is switched into action a couple is applied to the frame 5 in a plane perpendicular to the axis of the pivots 6. The motors 25, 25' are adapted to run in opposite directions.

Carried on the extension of the pivot 2 is an arm 27 which terminates in a wheel 28 adapted to act as an electric contact. Mounted on the frame 5 are two segmental contacts 29, 29' consisting of two plates of brass or other conducting material separated by a narrow gap of insulating material. The wheel 28 is engageable with the contacts 29, 29'. When the arms 20, 20' are in line, the wheel rests on the insulating gap.

The system composed of two gyroscopes, motors, arms etc. carried on the pivots 2, 2' is balanced so that it is neutral with respect to the frame 5, that is, if the system is displaced from the central position, i. e., that in which the arms 20, 20' are in line, no forces come into play, due to gravity, tending to restore it or to deflect it, towards or away from the central position.

The frame 5 is provided with a considerable amount of gravity control with respect to the pivots 6, that is, when the axes of the pivots 2, 2' are horizontal, the centre of gravity of the frame 5 and its carried system lies below the line of the pivots 6 and in a vertical plane which contains the axis of these pivots.

Electric current is conveyed to the gyroscope motors and to the motors 23, 23'; 25, 25' by means of the brushes 16 and the slip rings 15. A diagram of connections for the motors is shown in Fig. 3. One pole of a battery is connected through a switch 30 and rheostat 31 to a brush 16, the corresponding slip ring 15 being connected as shown to one terminal of each of the motors 23, 23'; and likewise the same supply pole is connected through a switch 30' and rheostat 31' to a second brush 16 the corresponding slip ring 15 of which is connected to one terminal of each of the motors 25, 25'. The second current supply pole is connected through a slip ring and brush to the arm 27 which carries the wheel 28. The remaining terminals of the motors 23, 23'; 25, 25' are connected as shown to the segmental contacts 29, 29'.

Now suppose the gyroscope spinning and the switches 30, 30' closed. When the wheel 28 rests on the insulating gap between the contacts 29, 29' the motors are out of action. As will be seen from the diagram, when the wheel 28 is on one or other of the contacts 29, 29', two motors come into action, one applying a couple to the frame 5 in a plane perpendicular to the axis of the pivots 6, the other applying a couple to the gyroscopes in a plane perpendicular to the axis of their supporting pivots. The motors are so connected up that the couple applied by the second mentioned motor tends to return the wheel 28 to the central position, and the couple applied by the first mentioned motor tends to cause the gyroscopes to precess so that the wheel 28 returns to central position. When the wheel 28 moves over to the second contact the other two motors come into action. Again the gyroscopes experience two couples, one acting about the pivots 2, 2' and tending to restore the gyroscopes to central position, and the other acting in a plane perpendicular to the axis of the pivots 6 in the direction which tends to cause the gyroscopes to precess so that the wheel 28 is returned to central position.

As already explained, the frame 5 with its carried system, is provided with a considerable amount of gravity control with respect to the pivots 6. The device as described, if set up on a moving vehicle with the pivots 6 lying athwart the vehicle, has the property, providing that the vehicle is moving with uniform speed, that its equilibrium position is one in which the centre of gravity of the frame 5 lies in the vertical plane containing the pivots 6 and in which the wheel 28 rests on the insulating gap.

The device as described may be operated in a variety of ways which may now be described.

Suppose the frame 5 to be displaced from the position in which the uprights 4, 4' are vertical. By means of the motor 19 the frames 9 and 5 are rotated so that the pivots 6 lie athwart the moving vehicle. The switch 30 is opened so that the motors 23, 23' are cut out of action. The switch 30' is closed and by adjusting the rheostat 31' one or other of the motors 25, 25' is caused to rotate rapidly when in action. Let us suppose that the couple due to either of the motors is greater than any gravity couple to which the device is exposed. As the result, when the switch 30' is closed, the gyroscopes precess so that the wheel 28 arrives at central position. The switch 30' is now opened and the switch 30 closed. As a consequence of the displacement of the frame 5 from the position in which the uprights 4, 4' are vertical the gyroscopes precess on the pivots 2, 2' so that the wheel 28 moves away from central position. One of the motors 23, 23' is brought into action and, in consequence, the gyroscopes experience couples which retard the precessional motion with the result that the frame 5 moves towards the position in which the uprights are vertical. When the deflection of the wheel 28 is a maximum, that is, when it comes to rest, the uprights 4, 4' are in vertical position; the switch 30 is then opened and the switch 30' closed, with the result that the gyroscopes precess on the pivots 2, 2' so that the wheel 28 moves towards and arrives at central position, when the revolving motor comes to rest.

The switch 30' is now opened and the wheel 28 observed. If it moves away from central position, the switch 30 is closed and allowed to remain closed until the excursion of the wheel is a maximum, when it is opened and the switch 30' closed. The wheel now moves towards and arrives at central position. The uprights 4, 4' of the frame 5 are now vertical. This second operation, it will be observed, is carried out for the purpose of testing whether or not the first operation had resulted in the uprights 4, 4' of the frame 5 being set exactly into the vertical.

In the second operation the resistance included in the circuit of the motors 23, 23' may be made large so that the motors revolve slowly. Under such conditions the wheel 28 will perform an appreciable excursion from central position even if the deflection of the uprights 4, 4' of the frame 5 from the vertical is small.

The frame 5 being vertical the uprights 4, 4' of the system may be trained round by means of the motor 19 into any desired position. No disturbance is introduced by the training operation. This is a consequence of the fact that the gyroscopes are similar, rotate in opposite directions, and are linked in such manner that they precess equally in opposite directions on the pivots which attach them to the frame 5.

The gyroscopes, it is observed, are neutral with respect to the pivots 2, 2'. Should a couple act on the frame 5 about the pivots 6, the gyroscopes precess on the frame pivots, the wheel 28 leaves the insulating gap and one or other of the motors 25, 25' comes into action with the result that the wheel 28 is restored to central position. If the disturbing couple continues to act, the gyroscopes will oscillate to and fro through a small angle, but the frame 5 will not depart sensibly from the position in which the uprights 4, 4' are vertical. There will, as a matter of fact, be small disturbance due to friction at the pivots and friction of the wheel 28 on the contacts 29, 29' and to the inertia of the gyroscopes, but these will be small if the gyroscopes are powerful. In this use of the device it is arranged that the couple due to the vane system of either of the motors 25, 25' is greater than any applied or disturbing couple to which the device may be subjected. The couples due to the motors may obviously be increased by introducing suitable reduction gearing between the spindles of the motors and the vane systems.

This method of operating the device is valuable in cases where there are mounted on the main frame triggers or other apparatus adapted to cooperate with members carried by the uprights or the equivalent.

I claim:—

A gyroscopic system comprising a frame, two similar gyroscopes comprising rotors spinning in opposite directions with the same angular speed and casings attached to said frame by two parallel pairs of pivots, a linkage system connecting said gyroscopes so that said gyroscopes perform equal and opposite precessions with respect to said frame, a second frame to which the first frame is attached by pivots disposed in a line perpendicular to said first mentioned pivots, the second frame being rotatable about a vertical axis, vanes rotatable about an axis collinear with one pair of said pairs of pivots and operative to apply couples whereby said gyroscopic system is stabilized, electric motors for rotating said vanes and a system of contacts controlling said motors, said system of contacts depending for its action on the shift of said linkage system, said linkage system being controlled by the operation of said gyroscopes.

JAMES GORDON GRAY.